(12) United States Patent
Fulton et al.

(10) Patent No.: US 9,126,524 B2
(45) Date of Patent: Sep. 8, 2015

(54) PEDESTRIAN ALERT SYSTEM FOR A MOTOR VEHICLE

(71) Applicant: GM Global Technology Operations LLC, Detroit, MI (US)

(72) Inventors: Christopher L. Fulton, Fenton, MI (US); Timothy C. Schutt, Whitmore Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 298 days.

(21) Appl. No.: 13/793,192

(22) Filed: Mar. 11, 2013

(65) Prior Publication Data

US 2014/0254815 A1    Sep. 11, 2014

(51) Int. Cl.
*B60Q 5/00* (2006.01)
(52) U.S. Cl.
CPC . *B60Q 5/00* (2013.01); *B60Q 5/008* (2013.01)
(58) Field of Classification Search
None
See application file for complete search history.

(56) References Cited

U.S. PATENT DOCUMENTS

| | | | |
|---|---|---|---|
| 3,835,256 A * | 9/1974 | Wieder | 381/341 |
| 8,179,234 B1 * | 5/2012 | Atwood | 340/384.3 |
| 2010/0060439 A1 * | 3/2010 | Fitzgerald | 340/431 |
| 2010/0245069 A1 * | 9/2010 | Noro | 340/441 |
| 2011/0026729 A1 * | 2/2011 | Nakayama et al. | 381/86 |
| 2011/0164774 A1 * | 7/2011 | Gladwin | 381/332 |
| 2011/0199199 A1 * | 8/2011 | Perkins | 340/435 |
| 2012/0182138 A1 * | 7/2012 | Nakayama et al. | 340/425.5 |
| 2013/0201704 A1 * | 8/2013 | Lin et al. | 362/464 |

\* cited by examiner

*Primary Examiner* — Paul Huber
(74) *Attorney, Agent, or Firm* — Cantor Colburn LLP

(57) ABSTRACT

A pedestrian alert system includes, a noise producing member having a primary acoustic output surface configured and disposed to direct noise from the noise producing member along a first axis, and at least one secondary acoustic output surface that allows noise to pass from the noise producing member along a second axis that is distinct from the first axis. An acoustic focusing member is provided about the noise producing member. The acoustic focusing member is configured and disposed to re-direct noise from the second axis toward the first axis.

18 Claims, 3 Drawing Sheets

PEDESTRIAN ALERT SYSTEM FOR A MOTOR VEHICLE

FIELD OF THE INVENTION

The subject invention relates to the art of motor vehicles and, more particularly, to a pedestrian alert system for a motor vehicle.

BACKGROUND

Most motor vehicles make a sound when operated. Internal combustion engines include many internal rotating components that produce noise. In addition, internal combustion engines produce combustion and exhaust sounds when operated. Many individuals, including the visually handicapped, rely on these noises/sounds to indicate the presence of a motor vehicle. Many modern vehicles, such as hybrid vehicles that include electric motors, and electric vehicles do not produce noises at a level that, in many cases, provides an audible indication of their presence. Often times, whatever noise that may be produced by a hybrid or an electric vehicle, is drowned out by ambient sounds. Accordingly, many manufacturers of hybrid vehicles and electric vehicles provide an alert system for pedestrians. The alert system includes a speaker that produces a noise to alert pedestrians to the presence of a vehicle. However, much of the noise produced by the speaker reflects back into the vehicle and is lost. Accordingly, it is desirable to provide a pedestrian alert system that, not only guides sound to outside portions of the vehicle to provide pedestrians with an indication that a vehicle is present, but also reduces undesirable noise that may impinge on a passenger compartment of the vehicle.

SUMMARY OF THE INVENTION

In accordance with an exemplary embodiment, a pedestrian alert system includes, a noise producing member having a primary acoustic output surface configured and disposed to direct noise from the noise producing member along a first axis, and at least one secondary acoustic output surface that allows noise to pass from the noise producing member along a second axis that is distinct from the first axis. An acoustic focusing member is provided about the noise producing member. The acoustic focusing member is configured and disposed to re-direct noise from the second axis toward the first axis.

In accordance with another exemplary embodiment, a motor vehicle includes a body having a plurality of body panels, and a pedestrian alert system provided on at least one of the plurality of body panels. The pedestrian alert system includes a noise producing member having a primary acoustic output surface configured and disposed to direct noise from the noise producing member along a first axis, and at least one secondary acoustic output surface that allows noise to pass from the noise producing member along a second axis that is distinct from the first axis. An acoustic focusing member is provided about the noise producing member. The acoustic focusing member is configured and disposed to re-direct noise from the second axis toward the first axis.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
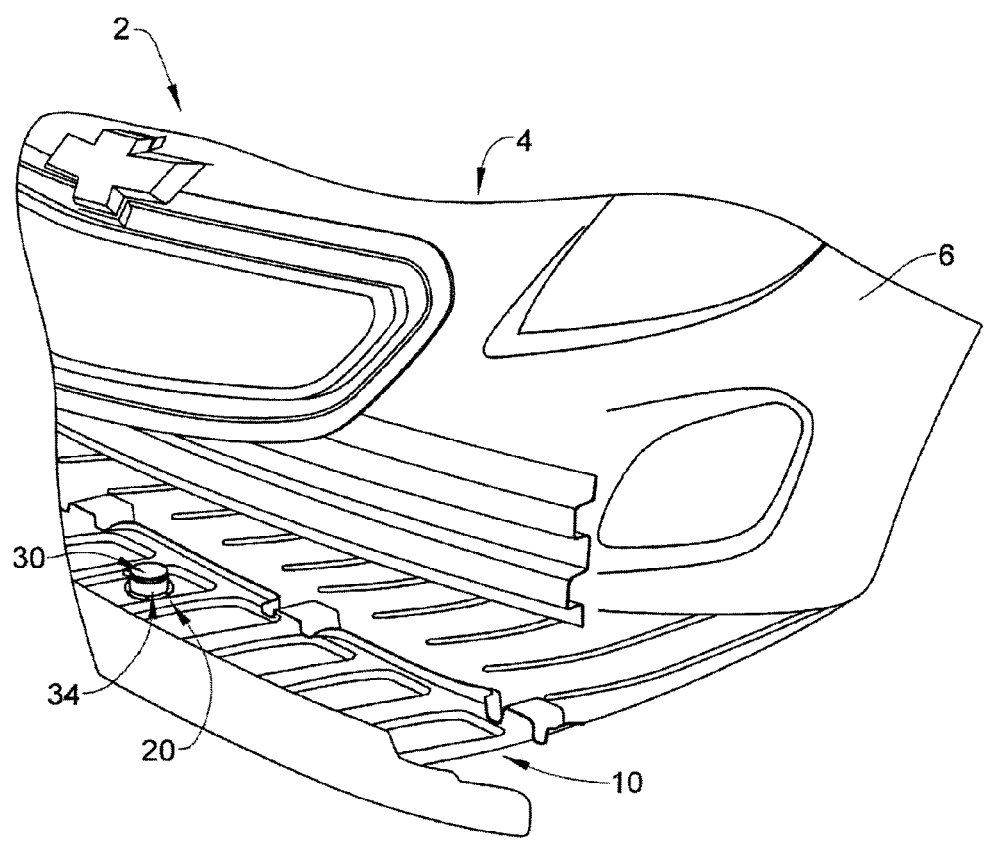
FIG. 1 is a partially exploded perspective view of a portion of a motor vehicle including a pedestrian alert system in accordance with an exemplary embodiment.

A motor vehicle in accordance with an exemplary embodiment is indicated generally at 2 in FIG. 1. Motor vehicle 2 may include any motor vehicle that may benefit from the system disclosed, and in one embodiment, takes the form of a hybrid vehicle. However, it should be understood that motor vehicle can also take the form of an electric vehicle. Motor vehicle 2 includes a plurality of body panels 4. Body panels 4 include exterior or outer body panels 6 that define an overall shape of motor vehicle 2, and interior panels that include underbody or aero panels, one of which is indicated at 10. Aero panel 10 closes off sections of motor vehicle 2 to improve an overall aerodynamic profile. Outer body panels 6 also contribute to the overall aerodynamic profile of motor vehicle 2. Aero panel 10 includes an acoustic output zone 15 (FIG. 3) which, as will be detailed more fully below, selectively emits an acoustic output to warn pedestrians of the presence of motor vehicle 2. At this point it should be understood that the following description is merely exemplary in nature and is not intended to limit the present disclosure, its application or uses. It should be further understood that throughout the drawings, corresponding reference numerals indicate like or corresponding parts and features.

Figure 2:
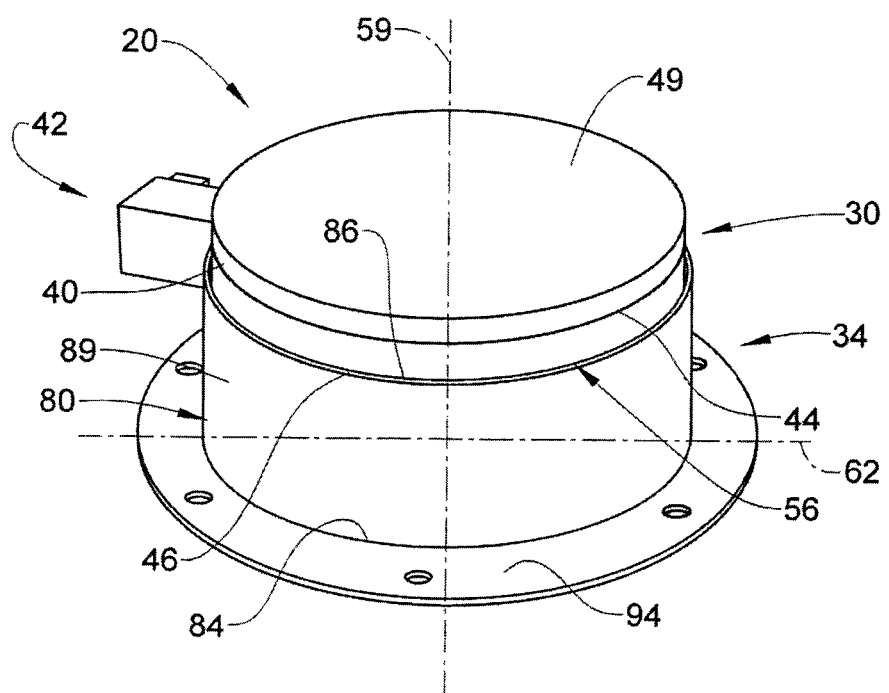
FIG. 2 is a perspective view of the pedestrian alert system provided on a body panel of the motor vehicle of FIG. 1.
Figure 3:
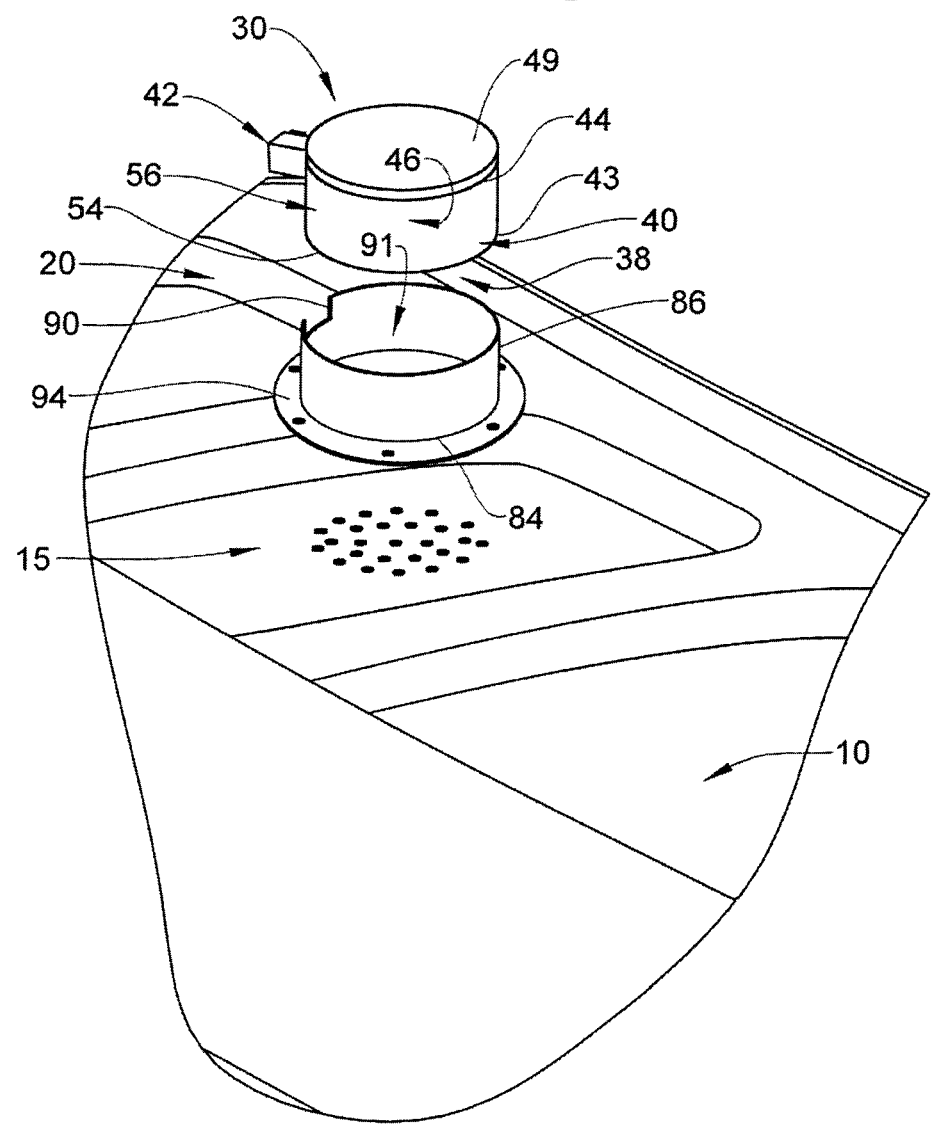
FIG. 3 is a partially dissembled view of the pedestrian alert system of FIG. 2.

In accordance with an exemplary embodiment, motor vehicle 2 includes a pedestrian alert system 20. Pedestrian alert system 20 provides a constant acoustic output that provides an audible warning of the presence of motor vehicle 2 lacking other acoustic output such as that provided by an internal combustion engine. The audible warning provides an alert to pedestrians that may be visually impaired or distracted. As shown in FIGS. 2 and 3, pedestrian alert system 20 is mounted to aero panel 10 at acoustic output zone 15. Pedestrian alert system 20 includes an acoustic or noise producing member 30 and an acoustic focusing member 34. Noise producing member 30 takes the form of a speaker 38 having a housing 40 provided with an electrical input member or terminal 42. Housing 40 includes a first end section 43 that extends to a second end section 44 through a generally annular sidewall 46. Second end section 44 is provided with a cover 49 that limits acoustic output.

Noise producing member 30 includes a primary acoustic output surface 54 and a secondary acoustic output surface 56. Primary acoustic output surface 54 is defined at first end section 42 and secondary acoustic output surface 56 is defined at annular sidewall 46. Primary acoustic output surface 54 guides an acoustic output along a first axis 59 that extends through acoustic output zone 15 and secondary acoustic output surface 56 passes an acoustic output along a second axis 62. Sound passing from primary acoustic output surface 54 provides an audible warning to pedestrians at or near motor vehicle 2. Sound passing from secondary acoustic output surface 56 is lost within motor vehicle 2 and thus does not contribute to any pedestrian alert. Actually, sound passing from secondary acoustic output surface 56 may degrade an acoustic quality of sound passing from primary acoustic output surface 54 thereby reducing the audible warning provided by noise producing member 30.

Acoustic focusing member 34 extends about noise producing member 30 to focus and guide sound passing from secondary acoustic output surface 56 generally back along the first axis 59 to contribute to the pedestrian alert provided by pedestrian alert system 20 and reduce unwanted noise in a passenger compartment (not shown) of motor vehicle 2. In accordance with an exemplary embodiment, acoustic focusing member 34 includes a body 80 having a first end 84 that extends to a second end 86 through a sound reflecting sidewall 89. Sound reflecting sidewall 89 includes sound reflecting qualities that are configured to reflect and/or focus sounds passing from noise producing member 30, and a cut-out 90 that accommodates terminal 42 and defines a central focusing duct 91 that surrounds secondary acoustic output surface 56. The sound reflecting qualities may result from a particular material used to form sound reflecting side sidewall 89 and/or a particular geometry of sound reflecting side wall 89. Central focusing duct 91 guides acoustic output passing from secondary acoustic output surface 56 toward acoustic output zone 15 and away from the passenger compartment. Acoustic focusing member 34 may be formed from any suitable material that is capable of focusing the acoustic output of pedestrian alert system 20. In accordance with an aspect of an exemplary embodiment, acoustic focusing member 34 is formed from aluminum. First end 84 is shown to include a mounting flange 94 that provides an interface between acoustic focusing member 34 and aero panel 10. Of course, it should be understood that acoustic focusing member 34 may also be materially integrally formed with aero panel 10. In such a case, acoustic focusing member 34 may be formed from the same material as aero panel 10 such as plastic, metal, and/or composites. However, acoustic focusing member 34 when materially integrally formed with aero panel 10 may also be formed from a different material.

At this point it should be understood that the exemplary embodiments provide a system for directing sound passing from secondary surface of a speaker towards a primary acoustic output. In this manner, sound that may otherwise have been lost to interior areas of a motor vehicle may be employed to enhance an acoustic alert provided to pedestrians at or near the motor vehicle. Also, while described as being mounted to an aero panel, the pedestrian alert system may be mounted in various locations of the motor vehicle.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A pedestrian alert system comprising:
a noise producing member including a primary acoustic output surface configured and disposed to direct noise from the noise producing member along a first axis, and at least one secondary acoustic output surface that allows noise to pass from the noise producing member along a second axis that is distinct from the first axis; and
an acoustic focusing member provided about the noise producing member, the acoustic focusing member being configured and disposed to re-direct noise from the second axis toward the first axis, wherein the noise producing member includes a housing having first and second opposing end sections joined by at least one sidewall, one of the first and second end sections defining the primary acoustic output surface and the at least one sidewall defining the secondary acoustic output surface.

2. The pedestrian alert system according to claim 1, wherein the first end section defines the primary acoustic output surface and the second end portion includes a cover.

3. The pedestrian alert system according to claim 1, wherein the at least one sidewall defines a generally annular sidewall.

4. The pedestrian alert system according to claim 3, wherein the acoustic focusing member extends about the generally annular sidewall.

5. The pedestrian alert system according to claim 1, wherein the acoustic focusing member includes a first end disposed at the primary acoustic output surface that extends to the second end through a sound reflecting sidewall.

6. The pedestrian alert system according to claim 5, wherein the first end includes a mounting flange.

7. The pedestrian alert system according to claim 1, wherein the acoustic focusing member is formed from aluminum.

8. The pedestrian alert system according to claim 1, wherein the noise producing member is a speaker configured and disposed to produce a predetermined acoustic output.

9. The pedestrian alert system according to claim 1, wherein the acoustic focusing member includes a central focusing duct, the noise producing member being arranged within the central focusing duct.

10. A motor vehicle comprising:
a body including a plurality of body panels; and
a pedestrian alert system provided on at least one of the plurality of body panels, the pedestrian alert system comprising:
a noise producing member including a primary acoustic output surface configured and disposed to direct noise from the noise producing member along a first axis, and at least one secondary acoustic output surface that allows noise to pass from the noise producing member along a second axis that is distinct from the first axis; and
an acoustic focusing member provided about the noise producing member, the acoustic focusing member being configured and disposed to re-direct noise from the second axis toward the first axis, wherein the noise producing member includes a housing having first and second opposing end sections joined by at least one sidewall, one of the first and second end sections defining the primary acoustic output surface and the at least one sidewall defining the secondary acoustic output surface.

11. The motor vehicle according to claim 10, wherein the first end section defines the primary acoustic output surface and the second end portion includes a cover.

12. The motor vehicle according to claim 10, wherein the at least one sidewall defines a generally annular sidewall.

13. The motor vehicle according to claim 10, wherein the acoustic focusing member includes a first end arranged at the primary acoustic output surface that extends to the second end through a sound reflecting sidewall.

14. The motor vehicle according to claim 13, wherein the first end includes a mounting flange secured to the at least one of the plurality of body panels.

15. The motor vehicle according to claim 14, wherein the plurality of body panels include at least one outer body panel, and at least one interior panel, the mounting flange being secured to the at least one interior panel.

16. The motor vehicle according to claim 15, wherein the at least one interior panel defines an underbody panel.

17. The motor vehicle according to claim 10, wherein the noise producing member is a speaker configured and disposed to produce a predetermined acoustic output.

18. The motor vehicle according to claim 10, wherein the acoustic focusing member includes a central focusing duct, the noise producing member being arranged within the central focusing duct.

* * * * *